May 27, 1969  M. G. HARWOOD ET AL  3,446,186
POULTRY PECKING SHIELD
Filed May 26, 1967
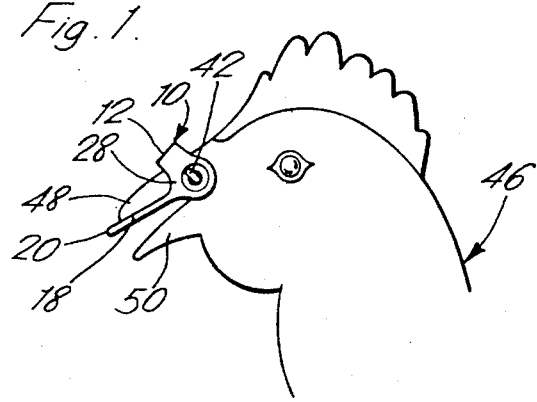
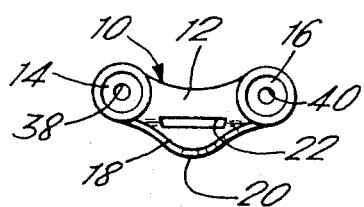
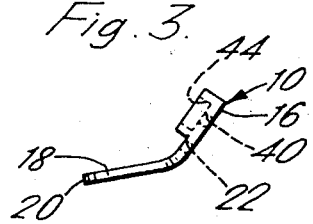
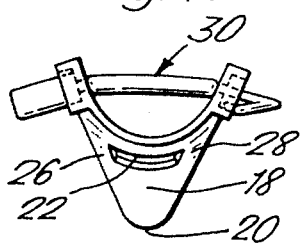
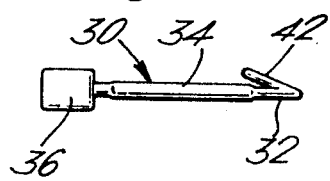
INVENTORS:
MILTON GENE HARWOOD
LOUIS JAY HARWOOD
BY Harry Ernest Rubens
ATTORNEY

United States Patent Office 3,446,186
Patented May 27, 1969

3,446,186
POULTRY PECKING SHIELD
Milton Gene Harwood and Louis Jay Harwood, both
c/o P.O. Box 38, Farmingdale, N.J. 07727
Filed May 26, 1967, Ser. No. 646,141
Int. Cl. A01k 37/00, 45/00
U.S. Cl. 119—97
1 Claim

ABSTRACT OF THE DISCLOSURE

A poultry shield having a mouth portion terminating in a dull rounded tip for projecting beyond the mouth of poultry when positioned between the upper and lower beak portions and having securing means extending from the lateral sides of the mouth portion for engaging the nostrils of the poultry.

---

This invention relates to a pecking shield for poultry and more particularly to a shield readily attached to the beaks of poultry to prevent pecking damage to the birds.

Poultry confined to a cage, readily establishes a pecking order and territorial rights, sometimes resulting in injury to a substantial portion of the flock with a consequent reduction in egg laying capacity.

Various types of anti-pecking devices have been devised to block the pecking vision. Other devices permit full vision but provide a gravity controlled shield to blunt the pecking blow.

We have found that we can control the position of the pecking shield by placing it in the mouth of the bird and between the upper and lower beak members.

Accordingly, the objects of our invention are to provide a shield in a position to continuously blunt the pecking blow and thereby reduce the pecking damage to the birds; to provide a shield terminating in a dull tip, that is positioned in the mouth of the bird and extends sufficiently beyound the end of the beak to prevent damage by the beak itself; to provide a shield that is held captive in position in the mouth of the bird by securing means positioned in its nostrils; to provide a shield that can be applied to a bird whose beak has been partially removed; to provide a shield that cannot be dislocated by the poultry, that will not catch on the wire screen used to contain poultry, which will not interfere with the drinking and eating habits of the bird; a device which is easy to apply and which when positioned will not disturb the bird so as to cause injury to itself, nor interfere with normal egg production.

We accomplish these and other objects and obtain our new results as will be apparent from the shield described in the following specification, particularly pointed out in the accompanying drawing in which:

FIG. 1 is a side elevation of the shield installed on the beak of poultry;

FIG. 2 is a top plan view of the shield itself;

FIG. 3 is a side elevation of the shield;

FIG. 4 is a top view of the shield with a fastener shown in locked position; and FIG. 5 is a top plan view of the fastener.

Referring in greater detail to the construction, the poultry shield 10, comprises the body 12, which joins two ear sections 14 and 16, to a shield portion 18. The shield portion extends perpendicularly from the body 12, and terminates in a rounded and dull shield tip 20. A slot 22 is formed between the body 12 and shield portion 18, for inserting the upper beak portion there-through. Thus the shield portion 18 remains joined to the body 12 by connecting portions 26 and 28.

The poultry shield is preferably mounted to the poultry by a fastener 30, shown in detail in FIG. 5. Such a fastener is described in greater detail in Patent No. 3,212,475. It is preferably made of nylon with a pointed self-locking tip 32, a stiff central portion 34 and a head section 36.

The pointed tip 32 of the fastener is inserted in an aperture 38 of the ear section 14, then through the nostrils of the poultry, finally passing through the aperture 40 of ear section 16, the barb 42 opening to self-lock the shield and fastener in position on the poultry beak.

The ear sections 14 and 16 are adventageously formed with a peripherally extending wall, see FIGS. 1 to 4, which serves to contain the barb 42, and head section 36 of the fastener to prevent the wire mesh of the cage from snagging on the poultry blinder.

The shield portion 18 conforms substantially to the periphery of the beak, extending sufficiently beyond the beak tip, when worn to blunt the peck of the bird and thus prevent damage between birds. If the shield is made of metal, the tip may be flattened at right angles to the direction of the peck to prevent the edge from cutting.

In assembling the poultry shield 10 to the upper and lower portions 48 and 50 of the beak 52 are opened and the poultry shield with the fastener inserted through aperture 38, is mounted over the upper beak portion 48, by inserting the upper beak into slot 22. This will cause the body 12, if made of flexible material, to conform to the curved upper surface of the beak, as is shown in FIGS. 1 and 4. The pointed tip of the fastener is then inserted through both nostrils and aperture 40, locking the shield in position.

The shield is preferably bent as is shown in FIG. 3, so that the shield portion 18 extends at an angle to the body portion 12, thus causing the shield portion 18 to fit against the inside of upper beak portion 48.

The device illustrated is preferably made of flexible plastic, such as polyethylene. However, the poultry shield may be made of metal, and in sheet form, curved to provide the body 12 as it fits around and below the upper beak portion 48 as is shown in FIG. 1.

The shield does not interfere with the drinking and eating habits of the poultry, and is not disturbing to the birds so as to lower egg production. The birds may continue to engage in their normal activities. However, the pecking damage is now prevented from occurring.

We have thus described our invention, but we desire it understood that it is not confined to the particular form shown and described, the same being merely illustrative, and that the invention may be carried out in other ways without departing from the spirit of our invention and by means of which objects of our invention are obtained and new results accomplished since the particular embodiment herein shown and described is only one of the many that can be employed to obtain these objects and accomplish these results.

We claim:

1. A pecking shield for mounting to the beaks of poultry comprising a single piece of material provided with a bit portion positioned in the mouth of poultry, a strap portion extending about the upper beak member and integrally connected to the bit portion on both sides of the beak, and fastening means for connecting the shield to the nostrils of the poultry.

References Cited

UNITED STATES PATENTS

| | | | |
|---|---|---|---|
| 2,125,389 | 8/1938 | Morelli | 119—97 |
| 2,445,867 | 7/1948 | Wolfson et al | 119—97 |
| 3,212,475 | 10/1965 | Harwood et al. | 119—97 |
| 3,254,628 | 6/1966 | Jones | 119—97 |

ALDRICH F. MEDBERY, Primary Examiner.